US011061153B2

(12) United States Patent
Jadrich et al.

(10) Patent No.: US 11,061,153 B2
(45) Date of Patent: Jul. 13, 2021

(54) FLEXIBLE DIGITAL RADIOGRAPHY DETECTOR

(71) Applicant: CARESTREAM HEALTH, INC., Rochester, NY (US)

(72) Inventors: Bradley S. Jadrich, North Port, FL (US); Timothy J. Wojcik, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 16/461,122

(22) PCT Filed: Dec. 19, 2017

(86) PCT No.: PCT/US2017/067197
§ 371 (c)(1),
(2) Date: May 15, 2019

(87) PCT Pub. No.: WO2018/118847
PCT Pub. Date: Jun. 28, 2018

(65) Prior Publication Data
US 2020/0064501 A1    Feb. 27, 2020

Related U.S. Application Data

(60) Provisional application No. 62/437,705, filed on Dec. 22, 2016.

(51) Int. Cl.
*G01T 1/20* (2006.01)
*G01T 7/00* (2006.01)
*G01N 23/083* (2018.01)

(52) U.S. Cl.
CPC ............. *G01T 7/00* (2013.01); *G01N 23/083* (2013.01); *G01T 1/2002* (2013.01); *G01T 1/2018* (2013.01); *G01N 2223/505* (2013.01); *G01N 2223/628* (2013.01); *G01N 2223/629* (2013.01)

(58) Field of Classification Search
CPC ....... G01T 7/00; G01T 1/2002; G01T 1/2018; G01T 1/2928; G01N 23/083; G01N 2223/505; G01N 2223/628; G01N 2223/629
USPC ........................................................ 250/366
See application file for complete search history.

(56) References Cited

U.S. PATENT DOCUMENTS

| | | | |
|---|---|---|---|
| 7,567,649 B1 * | 7/2009 | Safai | G01T 1/24 250/370.09 |
| 9,939,295 B2 * | 4/2018 | MacLaughlin | G03B 42/04 |
| 2002/0079458 A1 * | 6/2002 | Zur | H01L 27/14678 250/370.11 |

(Continued)

FOREIGN PATENT DOCUMENTS

| | | |
|---|---|---|
| EP | 2 169 429 | 3/2010 |
| WO | 2015/138329 | 9/2015 |

(Continued)

OTHER PUBLICATIONS

International Search Report dated Apr. 12, 2018 for International Application No. PCT/US2017/067197, 3 pages.

*Primary Examiner* — Kiho Kim

(57) ABSTRACT

A flexible DR detector assembly bendable along one axis and not bendable along a second axis is used with an x-ray source for radiographic imaging of a human anatomy, veterinary anatomy, or industrial equipment.

20 Claims, 8 Drawing Sheets

(56) References Cited

U.S. PATENT DOCUMENTS

| | | | | |
|---|---|---|---|---|
| 2003/0031296 A1* | 2/2003 | Hoheisel | ............... | G01T 1/2018 378/98.8 |
| 2003/0095389 A1* | 5/2003 | Samant | ................ | H01J 47/001 361/749 |
| 2008/0123171 A1* | 5/2008 | Dausch | ............... | F16K 99/0001 359/230 |
| 2010/0072379 A1* | 3/2010 | Nishino | ................ | G03B 42/04 250/363.08 |
| 2010/0078573 A1* | 4/2010 | Nishino | ............... | G01T 1/2928 250/393 |
| 2011/0108180 A1* | 5/2011 | Fendler | ............. | H01L 27/14618 156/50 |
| 2011/0116244 A1* | 5/2011 | Clayton | ................ | H05K 1/189 361/749 |
| 2013/0261415 A1* | 10/2013 | Ashe | ................ | A61B 5/14552 600/324 |
| 2016/0155526 A1* | 6/2016 | Arimoto | .............. | C09K 11/628 250/488.1 |
| 2016/0370303 A1* | 12/2016 | Schmitz | ............... | G01N 23/083 |
| 2017/0167900 A1* | 6/2017 | MacLaughlin | ........ | G03B 42/04 |

FOREIGN PATENT DOCUMENTS

| | | | | |
|---|---|---|---|---|
| WO | WO-2015138329 A1 * | 9/2015 | ............. | G01N 23/04 |
| WO | WO-2016115126 A1 * | 7/2016 | ........... | G01T 1/2018 |

* cited by examiner

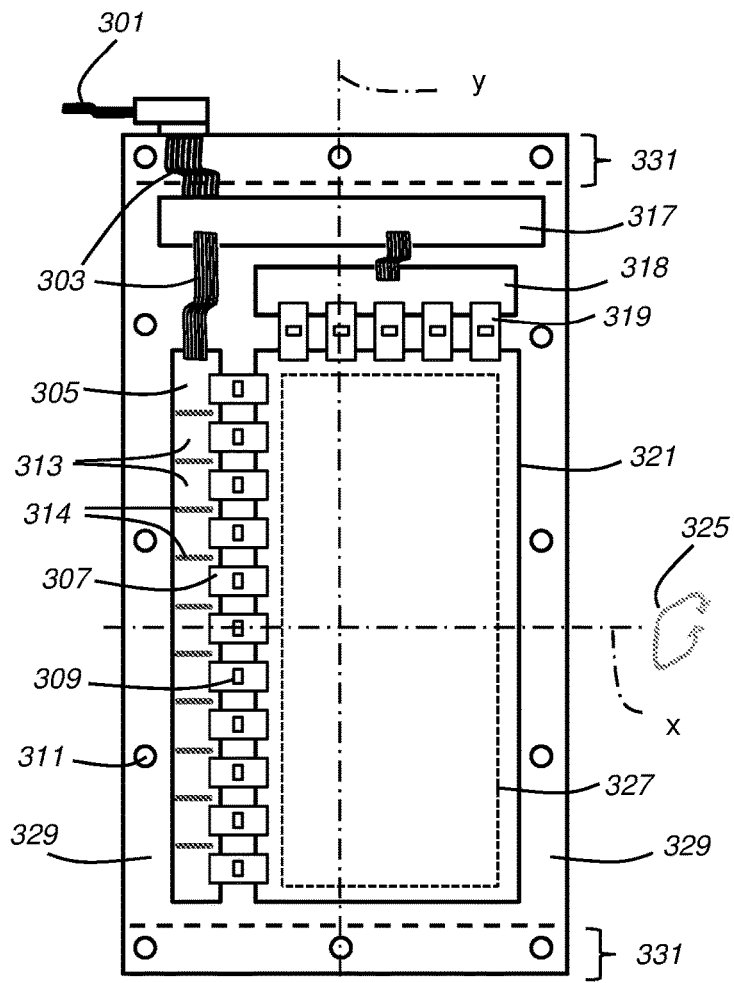
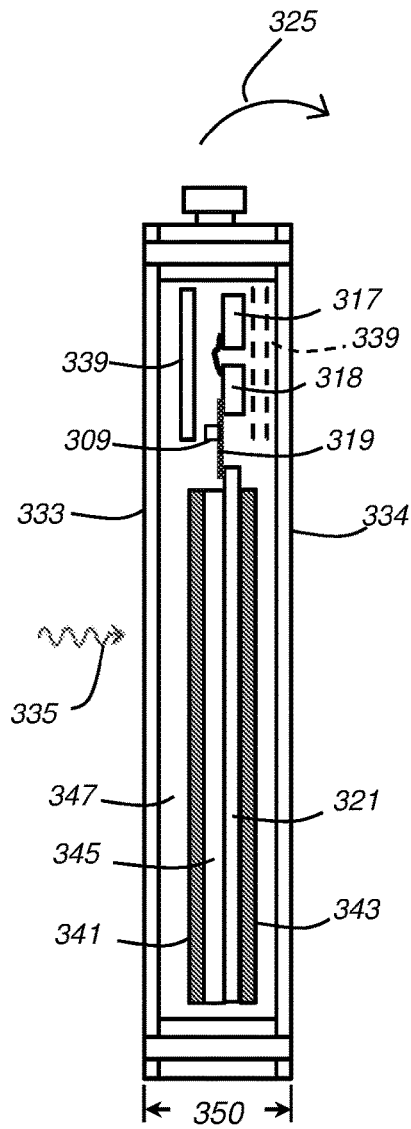
FIG. 3A
FIG. 3B

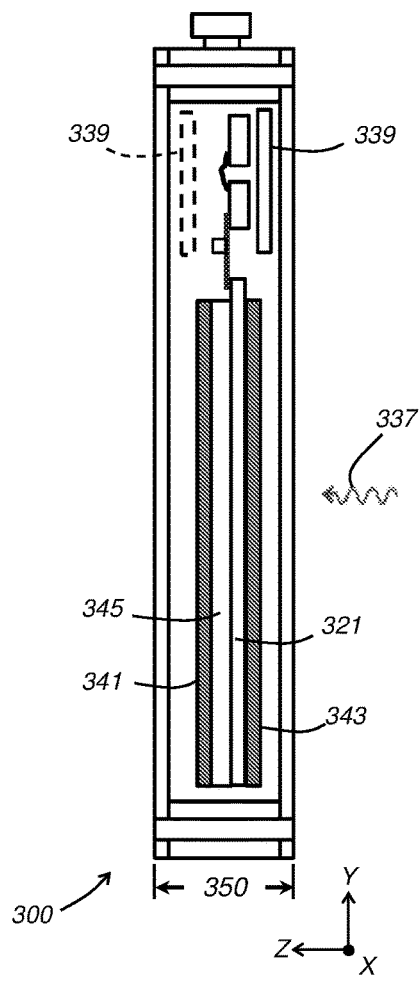
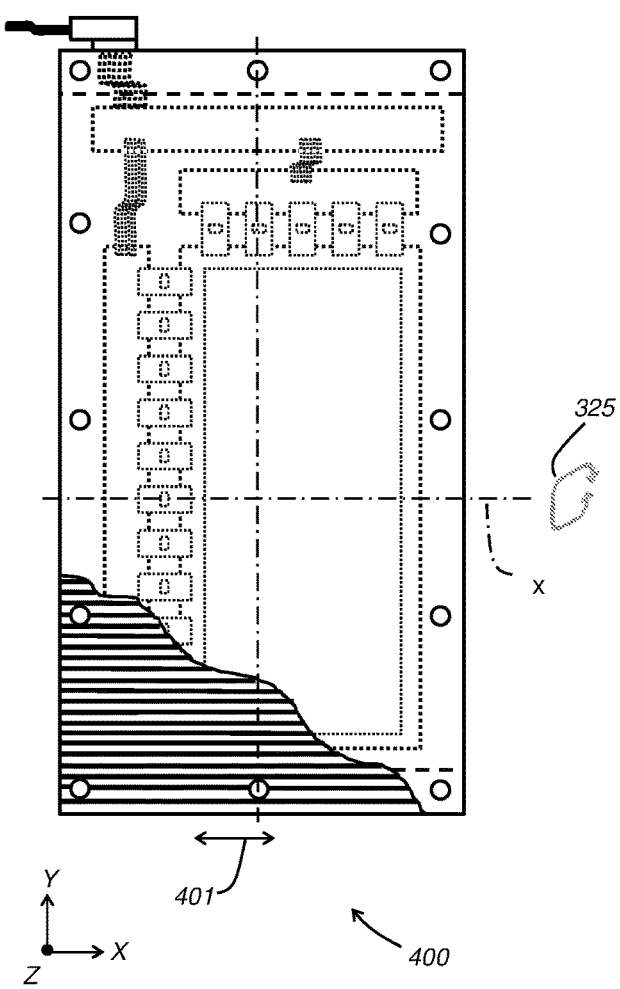
FIG. 3C
FIG. 4

FLEXIBLE DIGITAL RADIOGRAPHY DETECTOR

CROSS REFERENCE TO RELATED APPLICATIONS

This application claims the benefit of and is a U.S. National Phase filing of PCT Application PCT/US2017/067197 filed Dec. 19, 2017 entitled "FLEXIBLE DIGITAL RADIOGRAPHY DETECTOR", in the name of Jadrich et al., which claims benefit of U.S. Patent Application Ser. No. 62/437,705, filed Dec. 22, 2016, in the name of Jadrich et al., and entitled FLEXIBLE DIGITAL RADIOGRAPHY DETECTOR.

BACKGROUND OF THE INVENTION

The subject matter disclosed herein relates to a flexible and bendable digital radiography (DR) detector. The concepts presented can also be applied to non-destructive test (NDT) pipeline inspection applications, extended to veterinary DR, medical DR, and dental DR—wherever it is desired to have a flexible and bendable photodetector assembly.

The x-ray inspections encompassed by NDT applications are broad—covering industries ranging from aerospace, automotive, military, gas & oil, transportation, construction, power generation, and security. Due to large thickness and high absorption materials under inspection, the x-ray energy and exposure times are vastly greater compared with typical medical imaging of animal and human anatomies. X-ray sources operating at 150 kVp or higher, and exposure times greater than 10 seconds may be required. These applications and more, in particular NDT pipeline inspection, typically require the use of field deployable x-ray sources, Computed Radiography (CR) screens & reader, or DR detectors, along with portable computer software applications for imaging materials of various compositions.

The discussion above is merely provided for general background information and is not intended to be used as an aid in determining the scope of the claimed subject matter.

BRIEF DESCRIPTION OF THE INVENTION

A flexible DR detector assembly bendable along one axis to be used with an x-ray source to radiographically image a pipeline, body anatomy, dental anatomy, or veterinary anatomy. An advantage that may be realized in the practice of some disclosed embodiments of the flexible DR detector is more efficient radiographic imaging of industrial equipment in the field.

In one embodiment a flexible digital radiographic (DR) detector is defined by a pair of orthogonal axes. Flexible components of the detector that are manually bendable are positioned relative to a first axis. Stiffening components of the detector that prevent manual bending of the detector are positioned relative to a second axis orthogonal to the first axis.

In one embodiment, an industrial radiographic imaging system includes an x-ray source, an article of manufacture to be imaged by the radiographic imaging system, and a flexible x-ray detector configured to be manually bent to precisely match a curvature of the article and to be secured to the article. The flexible x-ray detector includes stiffening components to prevent bending of the flexible x-ray detector along one dimension and flexible components to allow bending of the detector along another perpendicular dimension thereof. The x-ray source is configured to emit x-rays toward the article for a preset period of time at a preset energy level and toward the flexible x-ray detector to capture radiographic images of the article.

In one embodiment, a flexible digital radiographic (DR) detector includes a housing having flexible front and back covers, flexible sidewalls are attached to the front and back covers of the housing and rigid sidewalls are attached to the front and back covers of the housing. The rigid sidewalls are parallel to each other and are adjacent the flexible sidewalls.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 3A is a plan view of an exemplary configuration of a flexible and bendable DR detector;

FIG. 3B is a side view of the exemplary construction of the flexible and bendable DR detector of FIG. 3A with front side x-ray exposure;

FIG. 3C is a side view of the exemplary construction of the flexible and bendable DR detector of FIG. 3A with alternate back side x-ray exposure;

FIG. 4 is a plan view of an exemplary section of a front laminate cover and fiber direction to allow bending around the x axis;

DETAILED DESCRIPTION OF THE INVENTION

This application claims priority to U.S. Patent Application Ser. No. 62/437,705, filed Dec. 22, 2016, in the name of Jadrich et al., and entitled FLEXIBLE DIGITAL RADIOGRAPHY DETECTOR, which is hereby incorporated by reference herein in its entirety.

Figure 1:
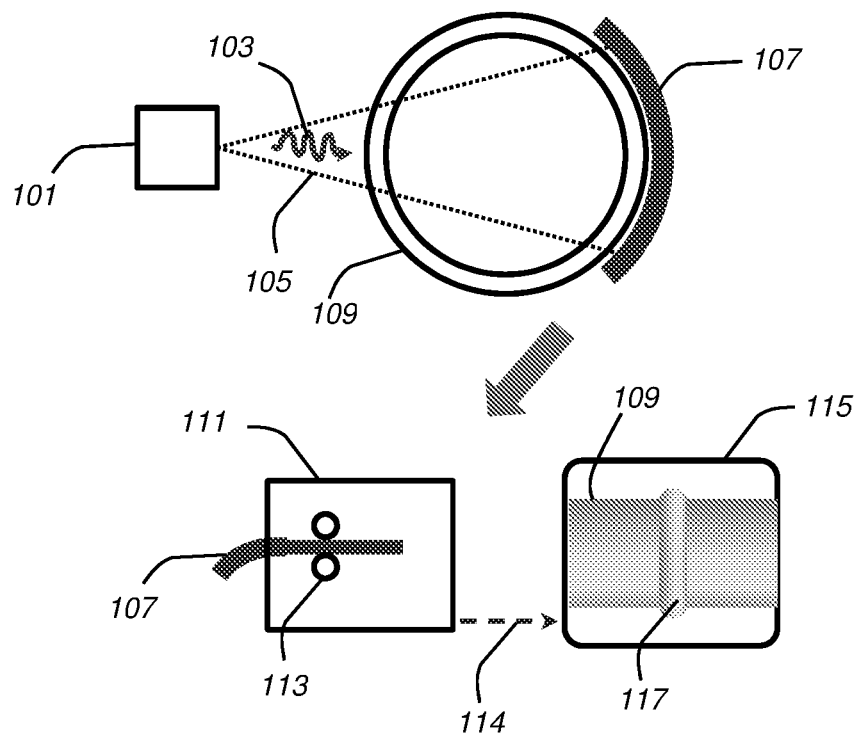
FIG. 1 illustrates a prior art radiography imaging system having an x-ray source, CR screen, CR reader & display.

Referring to the prior art system shown in FIG. 1, a flexible CR screen 107 is shaped to fit onto the external surface of a pipeline 109 under inspection, which pipeline 109 has a circular cross section and a weld 117 along at least a portion of the external surface, which weld may extend entirely through the pipe to the interior of the pipeline along at least a portion of the weld. The CR screen 107 is typically placed in a flexible protective sleeve which may include an additional X-ray absorption material to minimize secondary backscatter. Since pipelines are typically much larger relative to CR screens, multiple X-ray images are required to be captured around the entire circumference of the pipeline. An x-ray source 101 is positioned on one side of the pipeline 109 and is activated to emit a beam 105 of x-rays 103 into and through the pipeline 109 toward the CR screen 107. After each image is capture by the CR screen 107, the flexible CR screen 107 is inserted into a reader 111 for extracting the latent image. A final viewable image is prepared using an image extraction process 114 and is presented on a digital electronic display 115. The final image may be viewed by an inspector to determine if any portion of the pipeline 109, such as the weld 117, contains any cracks or anomalies that may need attention or repair. A primary disadvantage of this approach is the need to have a CR reader 111 in the field which may include electric powered mechanisms 113 to receive the CR screen 107 which adds cycle time due to the reader 111 imaging process.

Figure 2:
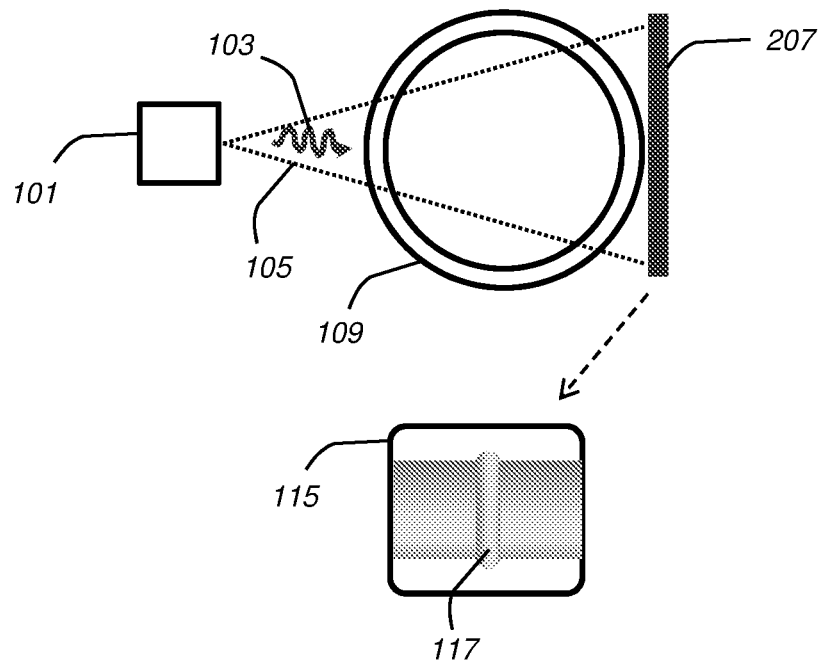
FIG. 2 illustrates a prior art radiography imaging system showing an x-ray source, flat panel DR detector & display.

Referring to the prior art x-ray imaging system shown in FIG. 2, a flat panel planar DR detector (FPD) 207 may be placed adjacent the outside surface of the pipeline 109 instead of the curved CR screen 107 shown in FIG. 1. Since the FPD 207 is rigid, planar and includes a two-dimensional array of electronic photosensors (FIG. 9), a majority of the photosensor array cannot be placed in close proximity to the pipeline 109. The FPD 207 typically includes electronic memory for storing captured digital radiographic images of the pipeline 109 and a wireless transmitter to efficiently send the captured images of the pipeline 109 to a digital display 115 for viewing or to transmit the captured radiographic images to another processing system for further handling. Geometry related image artifacts will result in the radiographic images of the pipeline 109 captured by the FPD 207 using this configuration of a planar FPD 207 adjacent a curved external surface of the pipeline 109, which is a disadvantage. However cycle time is improved compared with the process using the CR reader 111 because image data captured by the FPD 207 may be wirelessly transmitted therefrom immediately after capture. Even a wired connection, i.e., tethered, between the FPD 207 and a display 115, or other processing system, improves cycle time over the process using the CR reader 111.

Referring to one exemplary embodiment of a flexible radiographic detector disclosed herein, FIGS. 3A and 3B illustrate a flexible detector 300 having a two-dimensional photosensor array, which may hereafter be referred to as "array", of approximate size 100×400 mm for pipeline inspection and pipeline weld inspection. XYZ coordinates are illustrated in the figures to define and clarify orientation of the various views of detector embodiments shown in the figures. Similar to currently known two dimensional radiographic imaging arrays, a readout board, or PCB, 318 and gate driver board, or PCB, 305 electronics are typically electrically connected to the array 327 to communicate image data through flexible circuits known as Chip-On-Film (COF) components 307, 319. The COF components 307, 319, typically have an Application Specific Integrated Circuit (ASIC), e.g., 309, bonded thereto.

Radiographic image data and power is typically transferred between the readout and gate driver PCBs, 318, 305, respectively, digital & power PCB 317, and power and data cable 301 through flex interconnect cables 303. The power and data cable 301 is used to provide power to the flexible detector 300, to transmit image data captured by the flexible detector 300, and to transmit X-ray prep and exposure synchronization signals as between the x-ray source 101 and the flexible detector 300. The flexible DR detector 300 is not limited to an external power and data interface such as the power and data cable 301, but could also be configured to include a wireless transmitter and internal battery power, if desired, for a pipeline inspection application. The internal battery would also require flexibility about the bendable axis or placement in an extended rigid section of the detector 300, as disclosed herein.

To be configured as conformable against a curved, i.e., cylindrical, pipeline surface, the entire assembly of detector 300 needs to flex at least about the horizontal x axis in the flexure direction 325 as shown in FIG. 3A, which flexure direction, as illustrated, results in the detector 300 having its top and bottom edges curved toward the rear facing direction of the detector 300 as shown by the arrows 325 in FIG. 3B. This flexure may be said to cause a concave curvature of the rear facing side of the detector 300. This flexure may be referred to herein as a bending around the x axis or bending along the y axis. Thus, the x axis may be referred to as the stiffening, rigid, or linear axis, while the y axis may be referred to as the bending or curving axis. This configuration requires several key components to be flexible in this direction including the array 327, thin scintillator 345 formed on the array 327, gate driver PCB 305, array substrate 321, rear absorbing (backscatter) shield 341, front absorbing (backscatter) shield 343, and housing components such as front and rear laminate covers 333, 334, respectively, and two conformable, flexible, parallel side walls 329 that are parallel to the flexible y axis. The housing further includes two parallel rigid, stiffener side walls 331 at the top and bottom of the detector 300, parallel to the rigid x axis, which are configured to prevent bending of the detector 300 about the vertical y axis. The sidewalls 329, 331, are perpendicularly attached to the front and back covers 333, 334, respectively. In one embodiment, the sidewalls 329, 331, are integrally formed with the flexible front and back covers 333, 334. The stiffener sidewalls may be configured to have disposed therein, or be fabricated from, rigid materials such as aluminum, stiff plastics, carbon fiber, or a combination thereof. With regard to the flexible gate driver PCB 305, flexibility can either be accomplished by segmenting the gate driver PCB 305 into sections along the y axis, such as the sections 313 formed by cut lines, slits, or flexible portions 314, or the gate driver PCB 305 itself can be constructed using a flexible material such as a polyimide film. The flexible portions 314 may be formed of flexible material, such as a suitable flexible plastic or rubberized plastic, attached to and between the rigid sections 313. In one embodiment, the cut lines, slits, or flexible portions 314 are formed in the regions of the flexible gate driver PCB 305 between the COF components 307. If the readout PCB 318 is formed as a flexible readout PCB the cut lines, slits, or flexible portions 314 may be formed in the regions of the flexible readout PCB 318 between the COF components 319.

The conformable side walls 329 may be constructed using a cast or molded elastomeric material. Clamping holes 311 are provided around the perimeter of the flexible and bendable detector 300 through the conformable and stiffener sidewalls 329, 331, to allow manual bending to form the detector 300 into desired curved shapes or bend radii about the x axis and secure the detector 300 against an external surface of the pipeline 109, as explained herein. Although holes through the detector edges are illustrated, other suitable means for attachment may be used. In the embodiments disclosed herein, flexibility of the detector 300 around the x axis should be at least about 10x greater than the flexibility of the detector around the y axis as measured in SI units of pascals. In one embodiment, flexibility of the detector 300 around the x axis is about 70× greater than the flexibility of the detector around the y axis.

Referring to the FIG. 3B side view of detector 300, it may be desired that overall detector thickness 350 be minimized so that the detector 300 is more flexible about the x axis. In one embodiment, the overall detector thickness 350 is less than 15 mm, which is the typical thickness of current film & CR screen cassettes, as well as retrofit DR detectors. Since a pipeline 109 may be fairly large in diameter and fabricated with thick metal requiring high radiographic energy and fluence, one or more backscatter shields 341, 343, may desired to minimize secondary x-ray scatter such as, for example, scatter from x-rays impacting the detector 300 from the front side, e.g., x-ray beam 335, or alternatively, from the rear side, e.g., x-ray beam 337 (FIG. 3C). In addition, an alternative energy conversion layer (not shown) may be used between the x-ray source 101 and scintillator 345 to shape and optimize the x-ray beam 335 desired for a particular application. The front and rear backscatter shields 341, 343, and energy conversion layer materials are typically high atomic number elements or compounds for greatest x-ray absorption, such as copper, tin, lead, tungsten, or similar. In addition, because of the high x-ray energy used, it is desired that all critical electronics are protected with PCB shields 339 using similar high atomic number materials.

In one embodiment, the scintillator 345 material used for NDT pipeline inspection is typically a phosphor-in binder, Gadolinium Oxysulfide (GOS) type, although other embodiments are not limited to GOS and could possibly use Cesium Iodide (CsI) scintillator as well. It is preferred that the scintillator 345 be directly laminated to the array 327, using a thin and transparent Optical Coupling Adhesive (OCA). In one embodiment, the energy conversion layer and backscatter shields 341, 343, are laminated against the opposing sides of the scintillator 345 and flexible array substrate 321 respectively. In one embodiment, the assembly just described may be laminated and disposed within a housing of the detector 300. The space surrounding this laminated assembly within the housing's front and back laminate covers 333, 334, may be filled with a conformable material 347. Typical conformable materials may include closed or open cell foams, and cast or molded elastomers. Not only will the conformable material 347 provide added flexibility to the detector 300 for bending, but these conformable materials can also provide protection against the harsh exterior environments during pipeline inspection.

Referring to the side view of FIG. 3C, an alternate application of the detector 300 includes back side x-ray exposure such as by exemplary x-ray beam 337. In this embodiment, the rear backscatter shield 343, energy conversion layer (not shown), and PCB shield 339 are placed on opposite sides of the scintillator 345 compared with the front side X-ray exposure configuration. Improved imaging resolution is possible with this alternate configuration.

Although the x axis is illustrated as an axis around which the flexible detector components are configured, embodiments of the detector 300 may include a rigid gate driver PCB 305 and a flexible readout PCB 318, depending on how the photosensor array 327 is oriented in the detector 300. It may be preferable to minimize the number of components that require flexible fabrication materials, such that it may be optimal to configure the gate driver PCB 305 to be flexible around the x axis rather than the readout PCB 318 and the digital & power PCB 317 to both be flexible about an axis, x or y, depending on placement. The components of detector 300 described herein may be variously selectively positioned and electrically connected as appropriate to permit various placement and fabrication of the components as rigid, flexible, or a combination thereof.

Referring to FIG. 4 the front and back laminate covers 333, 334, respectively, in one embodiment of a radiographic detector 400, similar in most respects to the detector 300 embodiment described herein, may be fabricated using a directional fiber material. In one embodiment, carbon fiber plies are used, which have its fibers preferentially oriented in a direction 401 parallel to the x axis. This will inherently allow greater flexibility of the detector in a direction 325 about the x axis. Alternate laminate materials which have directional oriented grain or fibers in the x direction can also be used in this configuration.

Figure 5A:
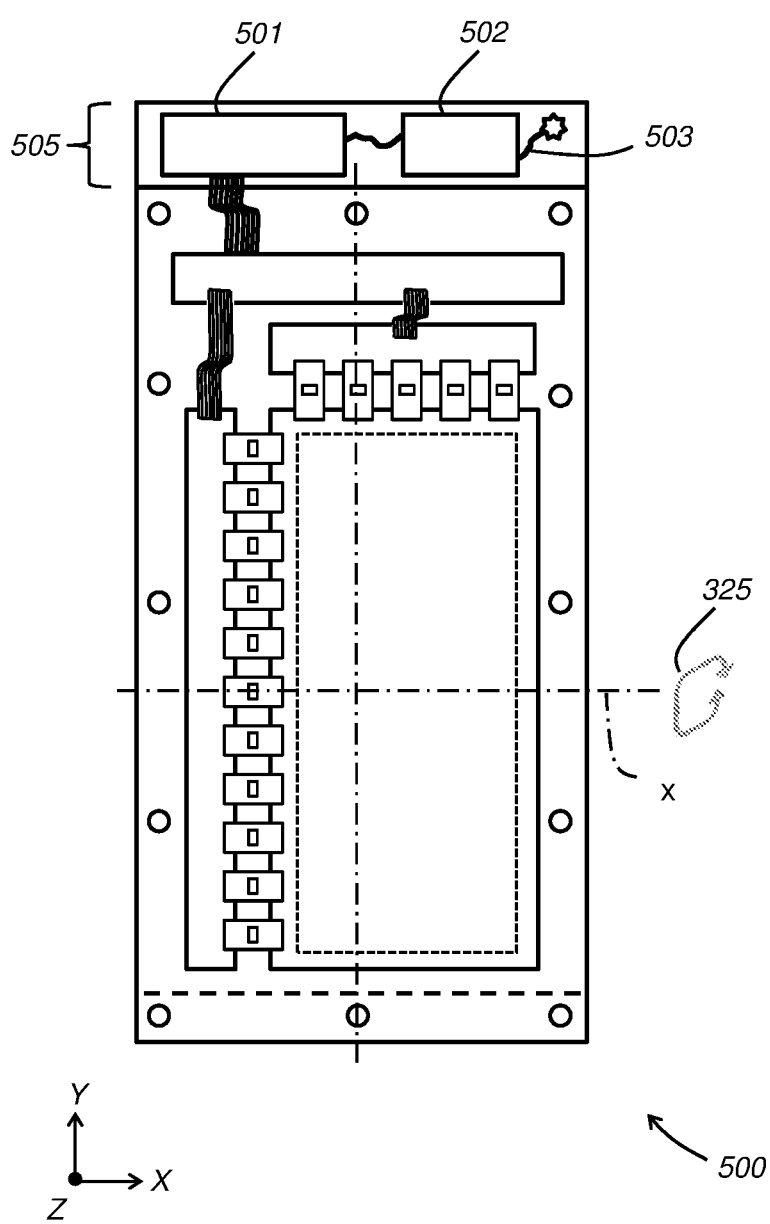
FIGS. 5A and 5B are plan and side views, respectively, showing an exemplary alternate embodiment of a wireless and battery powered bendable DR detector.
Figure 5B:
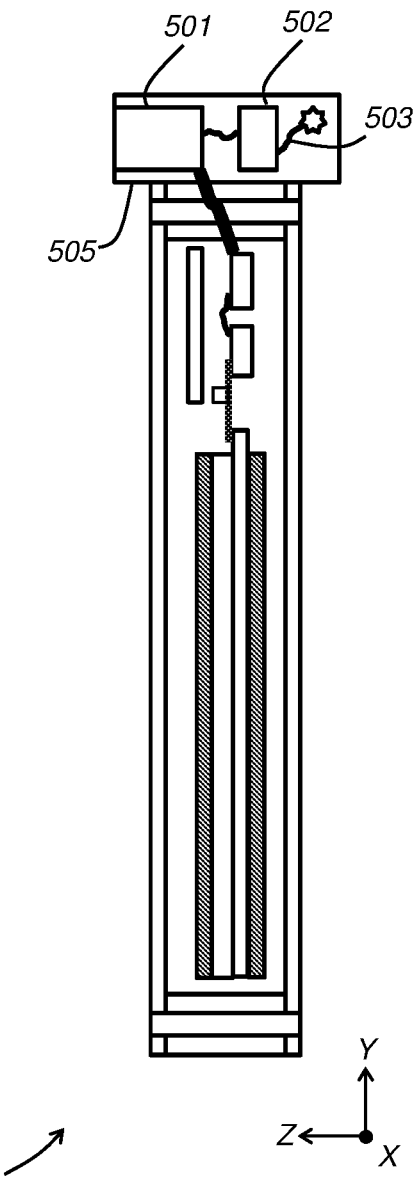

Referring to the embodiments of a radiographic detector 500 shown in FIGS. 5A and 5B, similar in most respects to the detector 300, 400, embodiments described herein, an extended rigid section 505 may be configured to at least partially enclose a replaceable battery 501, in addition to a radio transceiver 502 and antenna 503 for wireless operation of the flexible and bendable detector 500 as described herein, such as for transmitting image data of captured radiographic images. The battery type may also be chosen to achieve greatest charge cycle time required for the imaging application.

Figures 6A, 6B:
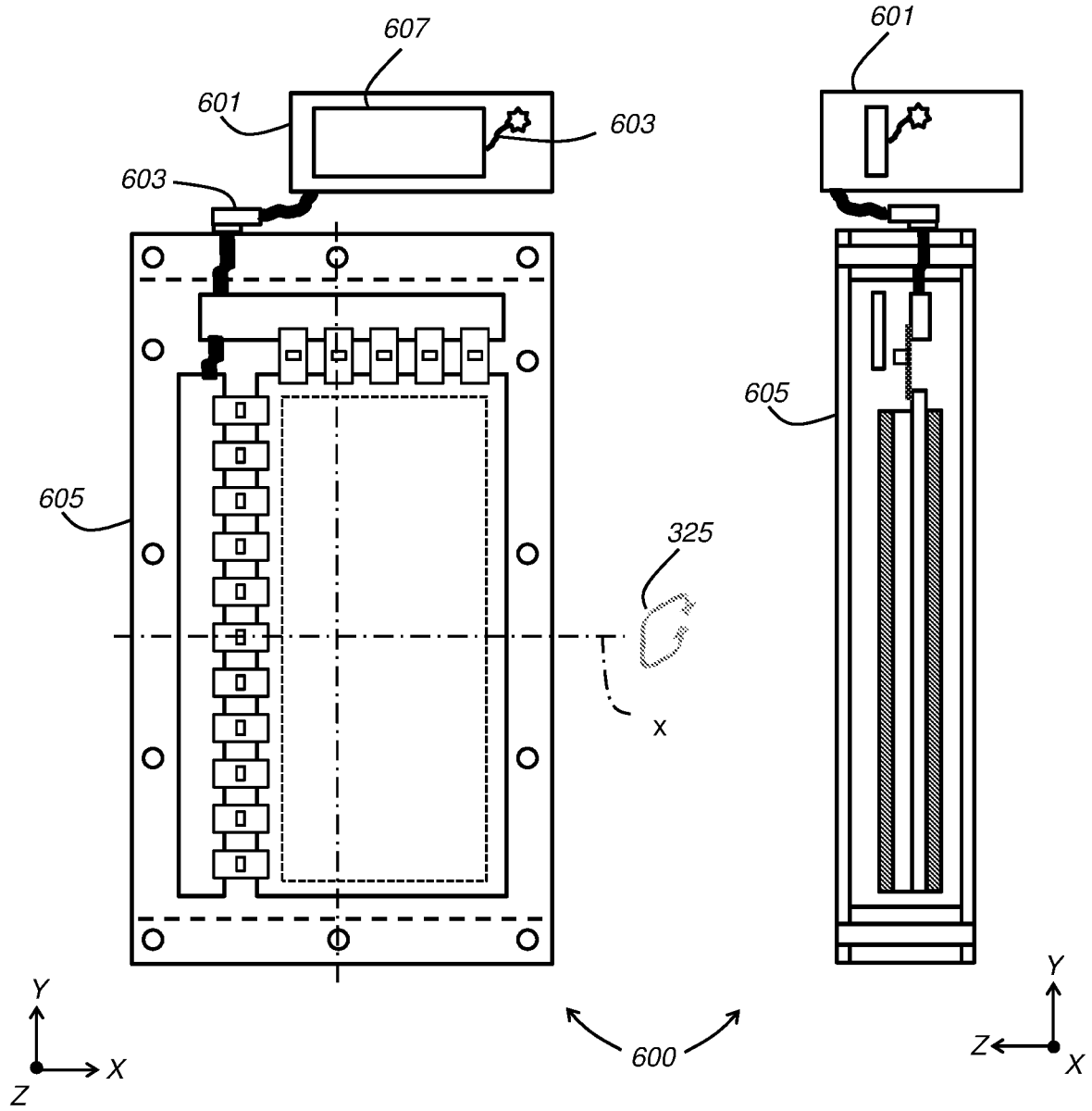
FIGS. 6A and 6B are plan and side views, respectively, showing an exemplary alternate embodiment of a bendable DR detector which utilizes a separate control and power module, with a bendable image sensor module.

Referring to the embodiments of a radiographic detector 600 shown in FIGS. 6A and 6B, similar in most respects to the detector 300, 400, 500, embodiments described herein, except that the digital & power PCB 317 is moved off-detector into a separate control and power module 601 that is interfaced to the detector's array section disposed in a bendable image sensor module 605, through a tethered type connector 603. The control and power module 601 may include the control electronics 607 including a radio transceiver, a power source such as an external source or an on-board battery (not shown), and communication interface such as a radio transceiver antenna 603.

Figure 7:
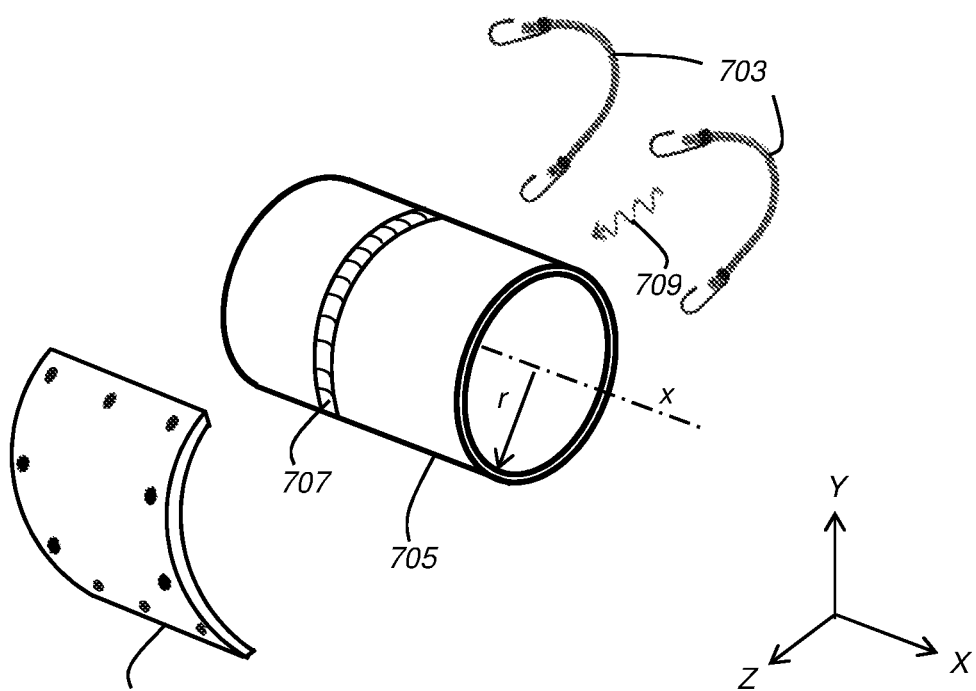
FIG. 7 is an exploded isometric view of an exemplary DR detector embodiment usable to wrap and hold the DR detector onto a curved pipeline.

Referring to the exploded isometric view of FIG. 7, there is illustrated an exemplary means to secure the bendable detector 300, 400, 500, 600, disclosed herein to a pipe 705 which may have a welded portion 707 therein. In one embodiment, hooked elastic or other connectable extension springs may be be used to secure the flexible, bendable detector 300, 400, 500, 600, against an outside surface of the pipeline 705 in a curved, full contact configuration, wherein all or almost all the array 327 area of the detector 300, 400, 500, 600, is positioned directly adjacent the exterior surface of the pipeline 705, which pipeline 705 may include any one of a number of radius of curvatures r. Typical pipeline sizes for this application may range from 2 in. ID to several feet OD. In the orientation shown in FIG. 7, the flexible detector 300, 400, 500, 600, is positioned on one exterior side of the pipeline 705 using hooked bungee cords 703 having hooks at opposite ends of the elongated cords placed into selected clamping holes 311, as appropriate, under elastic tension, to fix the detector 300, 400, 500, 600, against the surface of the pipeline 705, while an x-ray source (not shown) is positioned to face an opposite side of the pipeline 705 and activated to emit an x-ray beam 709 toward the detector 300, 400, 500, 600, for a preselected period of time at a preselected energy level.

Figure 8:
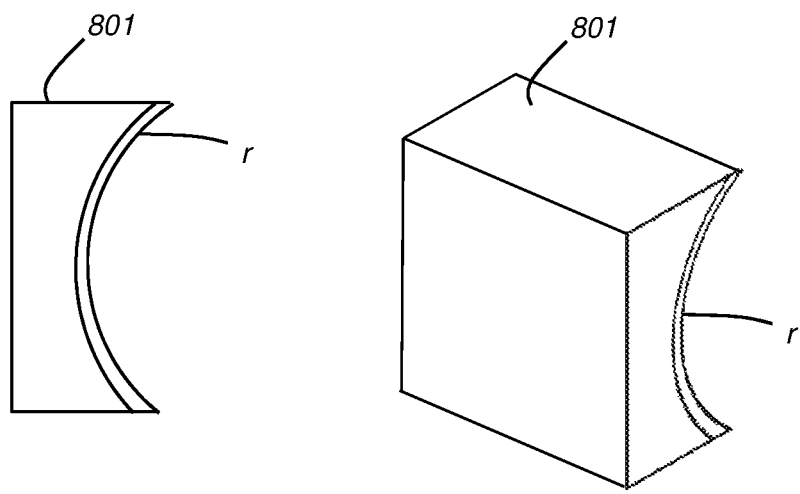
FIG. 8 is an exploded isometric view of an exemplary embodiment to form a curvature of the detector to fit onto rigid frames to match a fixed radius object, comparable to a pipeline radius.

Referring to FIG. 8, a side view and an isometric view illustrates an embodiment of a rigid frame 801 having a portion of radius r that contacts the detector 300, 400, 500, 600, to secure and bend the detector to a fixed and known radius r.

Figure 9:
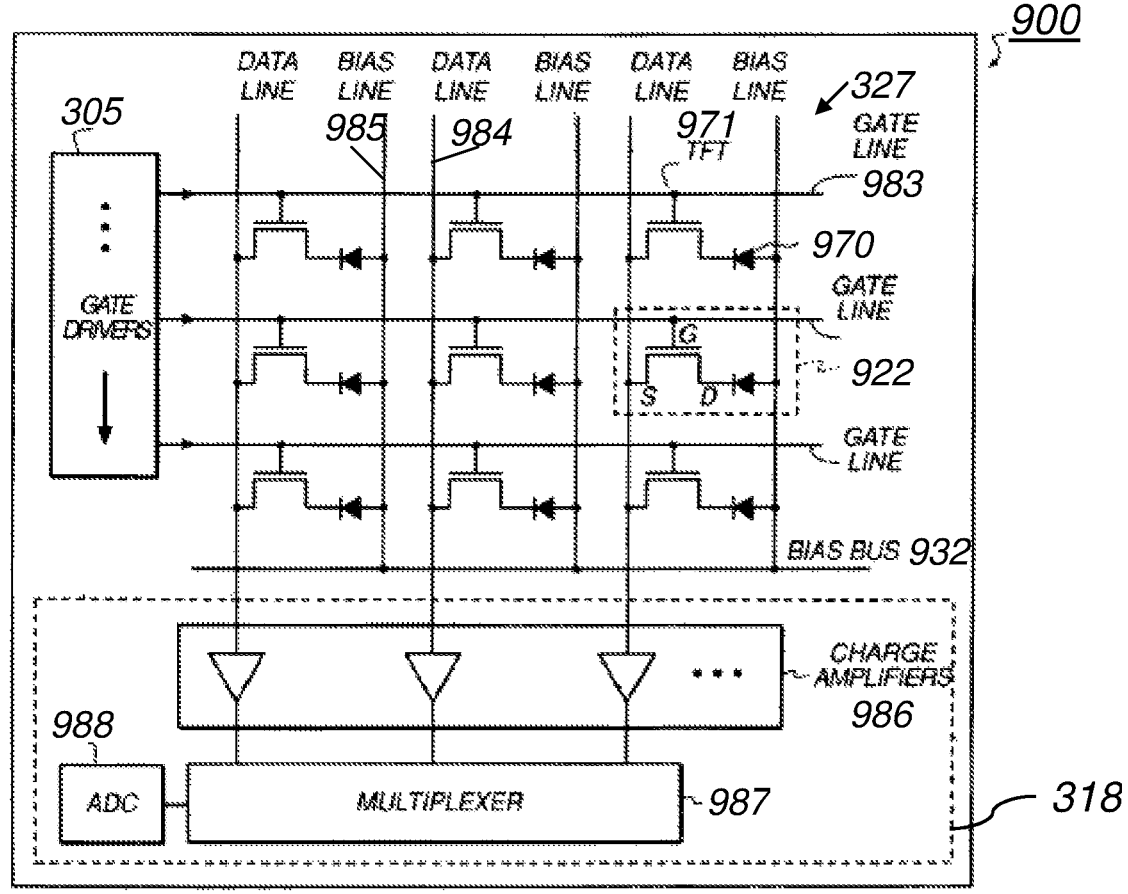
FIG. 9 is a schematic diagram of an exemplary photosensor array for a digital radiographic detector.

FIG. 9 is a schematic diagram 900 of a portion of a two-dimensional array of photosensors 327 for the DR detector 300, 400, 500, 600. The array of photosensors 327 may include a number of hydrogenated amorphous silicon (a-Si:H) n-i-p photodiodes 970 and thin film transistors (TFTs) 971 formed as field effect transistors (FETs) each having gate (G), source (S), and drain (D) terminals. In embodiments of DR detector 300, 400, 500, 600, disclosed herein, such as the multilayer components of DR detector 300, 400, 500, 600, the two-dimensional array of photosensor cells 327 may be formed in a device layer that abuts adjacent layers of the DR detector 300, 400, 500, 600, structure. A plurality of gate driver circuits 305 may be electrically connected to a plurality of gate lines 983 which control a voltage applied to the gates of TFTs 971, a plurality of readout circuits 318 may be electrically connected to data lines 984, and a plurality of bias lines 985 may be electrically connected to a bias line bus or a variable bias reference voltage line 932 which controls a voltage applied to the photodiodes 970. Charge amplifiers 986 may be electrically connected to the data lines 984 to receive signals therefrom. Outputs from the charge amplifiers 986 may be electrically connected to a multiplexer 987, such as an analog multiplexer, then to an analog-to-digital converter (ADC) 988, or they may be directly connected to the ADC, to stream out the digital radiographic image data at desired rates. In one embodiment, the schematic diagram of FIG. 9 may represent a portion of a DR detector 300, 400, 500, 600, such as an a-Si:H based indirect flexible and bendable panel imager.

Incident x-rays or x-ray beams 335, 337, are converted to optical photons, or light rays, by a scintillator 345, which light rays are subsequently converted to electron-hole pairs, or charges, upon impacting the a-Si:H n-i-p photodiodes 970. In one embodiment, an exemplary detector photosensor cell 922, may include a photodiode 970 having its anode electrically connected to a bias line 985 and its cathode electrically connected to the drain (D) of TFT 971. The bias reference voltage line 932 can control a bias voltage of the photodiodes 970 at each of the detector cells 922. The charge capacity of each of the photodiodes 970 is a function of its bias voltage and its capacitance. In general, a reverse bias voltage, e.g. a negative voltage, may be applied to the bias lines 985 to create an electric field (and hence a depletion region) across the pn junction of each of the photodiodes 970 to enhance its collection efficiency for the charges generated by incident light rays. The image signal represented by the array of photosensor cells 327 may be integrated by the photodiodes while their associated TFTs 971 are held in a non-conducting (off) state, for example, by maintaining the gate lines 983 at a negative voltage via the gate driver circuits 305. The array of photosensors 327 may be read out by sequentially switching rows of the TFTs 971 to a conducting (on) state by means of the gate driver circuits 305, which may be embodied as a PCB as described herein. When a row of the pixels is switched to a conducting state, for example by applying a positive voltage to the corresponding gate line 983, collected charge from the photodiode in those pixels may be transferred along data lines 984 and integrated by the external charge amplifier circuits 986. The row may then be switched back to a non-conducting state, and the process is repeated for each row until the entire array of photosensor cells 327 has been read out. The integrated signal outputs are transferred from the external charge amplifiers 986 to an analog-to-digital converter (ADC) 988 using a parallel-to-serial converter, such as multiplexer 987, which together comprise read-out circuit 318, which may be embodied as a PCB as described herein.

This digital image information may be subsequently processed by an external processing system or by an onboard processing component such as the digital & power PCB 317 to yield a digital image which may then be digitally communicated for immediate display on a monitor, or it may be displayed at a later time by accessing an on-board electronic memory containing the stored image. The flexible, bendable DR detector 300, 400, 500, 600, having an imaging array as described with reference to FIG. 9 is capable of both single-shot and rapid fire image acquisition.

Figure 10A:
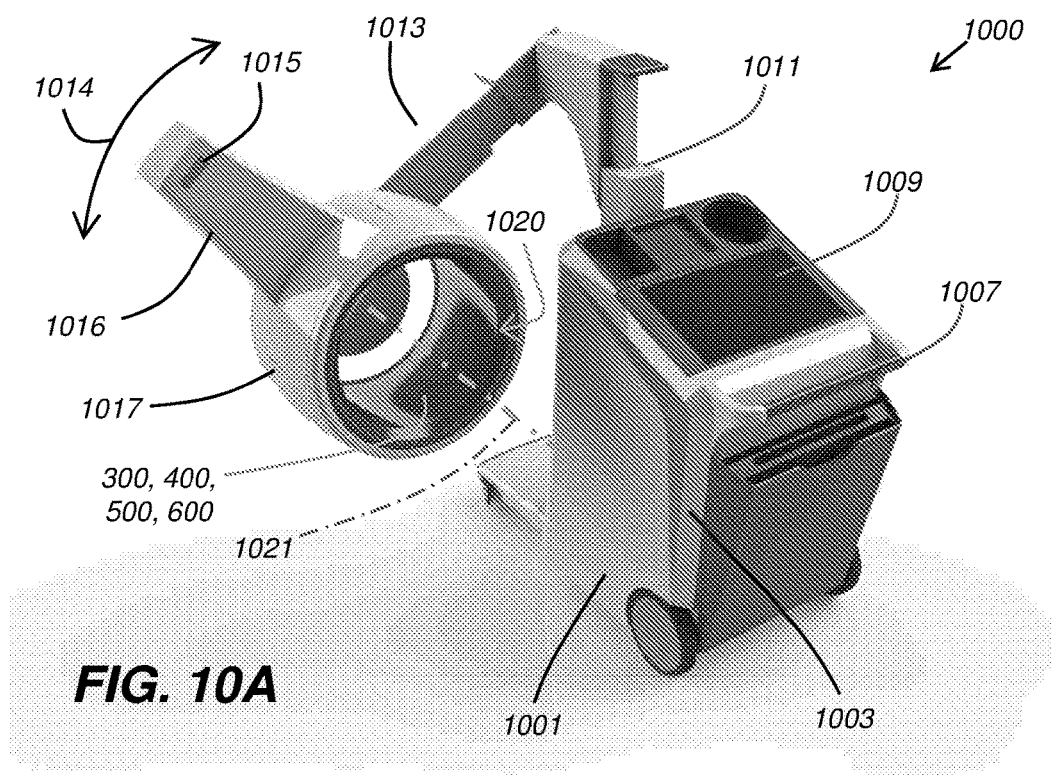
FIGS. 10A-10C are perspective and front views of an exemplary mobile imaging system having a cylindrical imaging ring using detector embodiments disclosed herein.

FIG. 10A illustrates a mobile CBCT imaging system 1000. The mobile imaging system 1000 includes a mobile base 1001 configured to travel across a floor or other surface, such as by manual manipulation using a handlebar 1007 configured to roll the mobile imaging system 1000 to a desired location. The wheeled base 1001 may include a processing system 1003 for operating various features of the imaging system. A processing system including a processor and electronic memory may be housed in the mobile base 1001 to provide image processing capabilities for digital images captured by the imaging system 1000.

A display 1009 is provided for viewing radiographic images transmitted to the mobile imaging system 1000 or captured by the mobile imaging system 1000. The display 1009 may also be used to provide an operator with a graphical user interface (GUI), which may be in the form of a touch screen, in electronic communication with the processing system 1003 for the operator to input control instructions and other commands to operate the mobile CBCT imaging system. A column 1011 is rotatably attached to the mobile base 1001 of the imaging system 1000. An arm 1013 is attached at one end to the column 1011 and may be rotated about an attachment point of the arm 1013 to the column 1011 as well as being extendable and retractable along its length.

An imaging ring, or scanning ring, 1017 is attached to one end of the arm 1013. As described herein, the imaging ring 1017 includes one or more movable sources, one or more flexible DR detectors 300, 400, 500, 600, a rotating mechanism attached to the source(s) and detector(s), and a housing to enclose these components. The imaging ring includes one or more sources, such as source 1015, to emit radiographic energy toward the one or more flexible detectors to capture radiographic images. The imaging ring 1017 is configured to revolve at least one source 1015 and one or more flexible DR detectors 300, 400, 500, 600, about an imaging axis 1021 in either a clockwise or counterclockwise direction as indicated by the double-headed arrow 1014. The source 1015 is positioned proximate one end of an extension 1016 attached to the imaging ring 1017 to increase a radial distance of the source 1015 from the imaging axis 1021. The imaging ring 1017 may be configured to be translatable along the imaging axis 1021 or transverse to the imaging axis 1021. In one embodiment, one or more flexible DR detectors 300, 400, 500, 600, may be revolved simultaneously with a source 1015 about the imaging axis 1021. In one embodiment, the one or more flexible DR detectors 300, 400, 500, 600, may revolve simultaneously with the source 1015 while positioned diametrically opposite the source in relation to the imaging axis 1021. The interior of the imaging ring between the imaging axis 1021 and an interior cylindrical surface of the imaging ring 1017 may be referred to as the imaging bore. The source 1015 and one or more flexible DR detectors 300, 400, 500, 600, are positioned in relation to an imaging axis 1021 so that the detectors may capture one or more radiographic images of a subject placed at or proximate to the imaging axis 1021 within the bore surrounded by the imaging ring 1017 and exposed to the radiographic energy emitted by the source 1015. Subjects placed at or proximate to the imaging axis 1021 may include human and or animal patients.

The imaging ring 1017 includes an open end 1020 configured to provide access for positioning a human or animal subject proximate to the imaging axis 1021 in the imaging bore to be radiographically imaged. Although not shown, the standard x-ray source 1015 may include a collimator to appropriately shape an x-ray beam emitted by the source 1015. The mobile base may also contain a generator electrically connected to the x-ray source 1015 to provide power for firing the x-ray source 1015. As the source 1015 and the one or more flexible DR detectors 300, 400, 500, 600, revolve about the imaging axis 1021, the source 1015 may be fired multiple times such that the one or more flexible DR detectors 300, 400, 500, 600, capture multiple images of a subject positioned at or near the imaging axis 1021. In one embodiment, the source 1015 may be fired 60 times during a 360° revolution about the imaging axis 1021 to generate 60 radiographic images captured in one or more flexible DR detectors 300, 400, 500, 600. In one embodiment, the source 1015 may be fired 360 times during a 360° revolution about the imaging axis 1021 to generate 360 radiographic images captured in one or more flexible DR detectors 300, 400, 500, 600. The source 1015 may be fired any number of times during a revolution about the imaging axis 1021. The source 1015 and one or more flexible DR detectors 300, 400, 500, 600, may be revolved at less than 360° about a subject positioned at imaging axis 1021 to generate multiple radiographic images captured in one or more flexible DR detectors 300, 400, 500, 600.

Figure 10B:
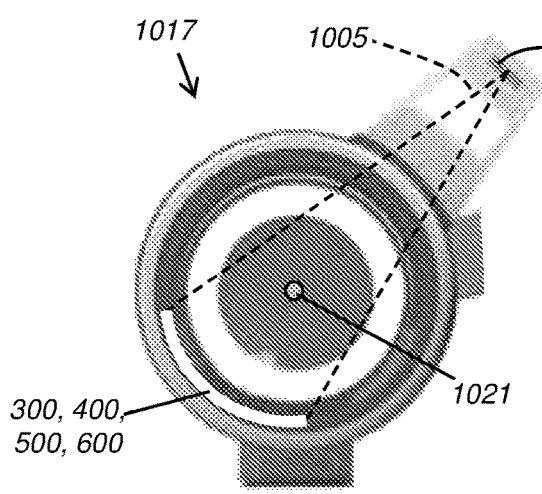
Figure 10C:
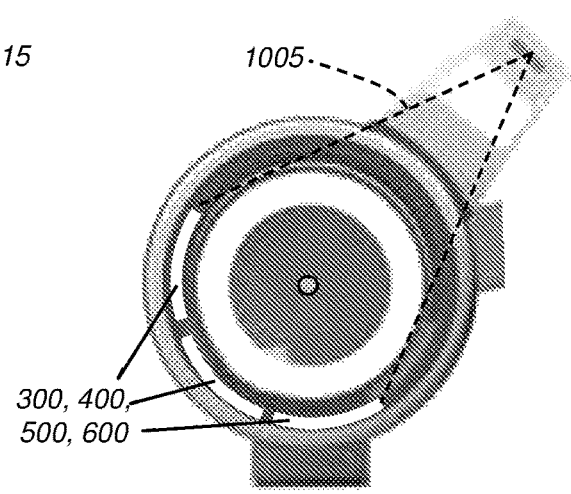

FIGS. 10B-C are front views of imaging ring 1017. The one or more flexible DR detector 300, 400, 500, 600, embodiments described herein each include a two-dimensional array of photosensors disposed along a surface of the detector, which surface faces the imaging axis 1021, and is configured to receive x-rays from the x-ray source 1015 disposed in the imaging ring 1017. The curved array of photosensors may be disposed along the curved interior surface of the imaging bore onto a curved support surface. The curved surface of the one or more flexible DR detectors 300, 400, 500, 600, may be bent into the shape of the portion of the interior cylindrical surface of imaging ring 1017. The curved surface of the one or more flexible DR detectors 300, 400, 500, 600, detector may embody a radius of curvature equivalent to a radius of curvature of the interior surface of the imaging ring 1017. As shown in FIGS. 10B-C, an x-ray source 1015 emits an x-ray beam 1005 that radiates toward the imaging axis 1021 and to one or more flexible DR detectors 300, 400, 500, 600, disposed at a position diametrically opposed to the x-ray source 1015 in relation to imaging axis 1021. In one embodiment as shown in FIGS. 10B-C, the one or more flexible DR detectors 300, 400, 500, 600, may extend around a circumference of the imaging ring 1017 for about 90° or greater.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A flexible digital radiographic (DR) detector comprising:
   a flexible two-dimensional photosensor array formed on a flexible substrate for capturing radiographic image data, the array having a width parallel to a first axis of the detector and a length parallel to a second axis of the detector, the array length greater than the array width;
   a first circuit operable to transfer the captured radiographic image data, the first circuit formed on a rigid circuit board adjacent to a first side of the array, the rigid circuit board having a length dimension parallel to the first axis of the detector thereby serving to prevent manual bending of the detector around the second axis, the first circuit electrically connected to the array by a plurality of flexible chip-on-film connectors; and
   a second circuit operable to transfer the captured radiographic image data, the second circuit formed on a plurality of rigid circuit board sections aligned adjacent to a second side of the array parallel to the second axis of the detector, the plurality of rigid circuit board sections configured to allow the detector to be manually bendable around the first axis, the second axis of the detector orthogonal to the first axis of the detector, the second circuit electrically connected to the array by a plurality of flexible chip-on-film connectors each connected to the array and to one of the plurality of rigid circuit board sections.

2. The flexible DR detector of claim 1, wherein the plurality of rigid circuit board sections comprises flexible slits, cut lines, flexible connector material, or a combination thereof.

3. The flexible DR detector of claim 1, wherein each of the circuit board sections is fabricated from a polyimide substrate.

4. The flexible DR detector of claim 1, wherein the flexible photosensor array is laminated against a flexible scintillator.

5. The flexible DR detector of claim 4, further comprising a flexible backscatter shield.

6. The flexible DR detector of claim 4, further comprising a flexible housing having flexible front and back covers and flexible sidewalls.

7. The flexible DR detector of claim 6, further comprising a conformable material between the flexible front and back covers of the housing and the photosensor array.

8. The flexible DR detector of claim 6, wherein the flexible front and back covers comprise unidirectional oriented fiber or anisotropic material having a first stiffness parallel to the first axis and having a second stiffness parallel to the second axis, wherein the first stiffness is greater than the second stiffness.

9. The flexible DR detector of claim 6, wherein the detector further includes two rigid sidewalls each adjacent to the flexible sidewalls.

10. The flexible DR detector of claim 9, further comprising at least two clamping holes through each of the rigid sidewalls.

11. The flexible DR detector of claim 1, further comprising at least two clamping regions near each edge of the detector that is parallel to the first axis, wherein the clamping regions are each configured to receive a connector at one end of an elastic member.

12. The flexible DR detector of claim 11, wherein the elastic member comprises a hooked bungee cord or an attachable spring.

13. A flexible digital radiographic (DR) detector comprising:
a flexible two-dimensional photosensor array formed on a flexible substrate for capturing radiographic image data, the array having a width parallel to a first axis of the detector and a length parallel to a second axis of the detector, the array length greater than the array width;
a readout circuit for reading out the captured radiographic image data, the readout circuit formed on a rigid circuit board adjacent to a first side of the array, the rigid circuit board having a length dimension parallel to the first axis of the detector thereby serving to prevent manual bending of the detector around the second axis, the readout circuit electrically connected to the array by a plurality of flexible chip-on-film connectors; and
a gate driver circuit for reading out the captured radiographic image data, the gate driver circuit formed on a plurality of circuit board sections aligned adjacent to a second side of the array parallel to the second axis of the detector, the plurality of rigid circuit board sections configured to allow the detector to be manually bendable around the first axis, the second axis of the detector orthogonal to the first axis of the detector, the gate driver circuit electrically connected to the array by a plurality of flexible chip-on-film connectors each connected to the array and to one of the plurality of circuit board sections.

14. The flexible DR detector of claim 13, wherein the plurality of circuit board sections are connected together by flexible slits, cut lines, flexible connector material, or a combination thereof.

15. The flexible DR detector of claim 13, further comprising a flexible housing enclosing the photosensor array, the readout circuit and the gate driver circuit, the flexible housing having flexible front and back covers and flexible sidewalls.

16. The flexible DR detector of claim 15, further comprising a conformable material between the flexible front and back covers of the housing and the photosensor array.

17. The flexible DR detector of claim 16, wherein the flexible front and back covers comprise unidirectional oriented fiber or anisotropic material having a first stiffness parallel to the first axis and having a second stiffness parallel to the second axis, wherein the first stiffness is greater than the second stiffness.

18. The flexible DR detector of claim 15, further comprising at least two clamping holes through the housing, the clamping holes configured to attach ends of an elastic member therebetween.

19. The flexible DR detector of claim 18, wherein the elastic member comprises a hooked bungee cord or an attachable spring.

20. A flexible digital radiographic (DR) detector comprising:
a flexible two-dimensional photosensor array formed on a flexible substrate for capturing radiographic image data, the array having a width parallel to a first axis of the detector and a length parallel to a second axis of the detector, the array length greater than the array width;
a first circuit operable to transfer the captured radiographic image data, the first circuit formed on a rigid circuit board separate from and adjacent to a first side of the flexible substrate, the rigid circuit board having a length dimension parallel to the first axis of the detector thereby serving to prevent manual bending of the detector around the second axis, the first circuit electrically connected to the array by a plurality of flexible chip-on-film connectors; and
a second circuit operable to transfer the captured radiographic image data, the second circuit formed on a plurality of rigid circuit board sections separate from, and aligned adjacent to, a second side of the flexible substrate parallel to the second axis of the detector, the plurality of rigid circuit board sections configured to allow the detector to be manually bendable around the first axis, the second axis of the detector orthogonal to the first axis of the detector, the second circuit electrically connected to the array by a plurality of flexible chip-on-film connectors each connected to the array and to one of the plurality of rigid circuit board sections.

* * * * *